United States Patent Office 2,698,460
Patented Jan. 4, 1955

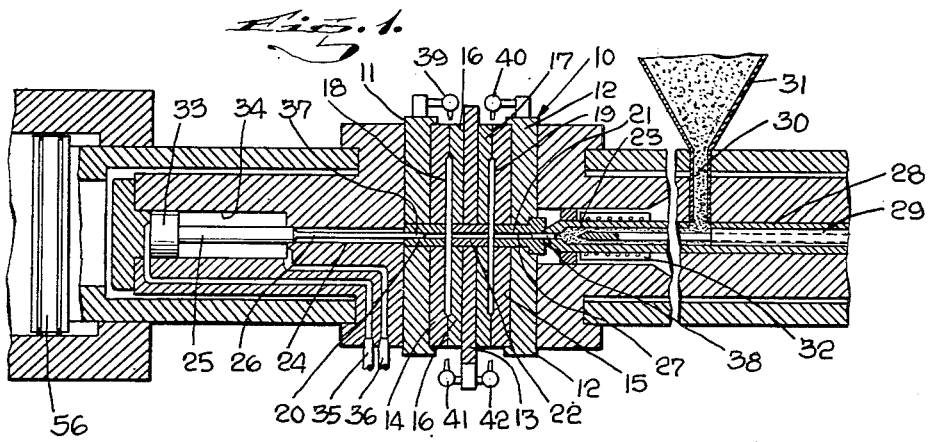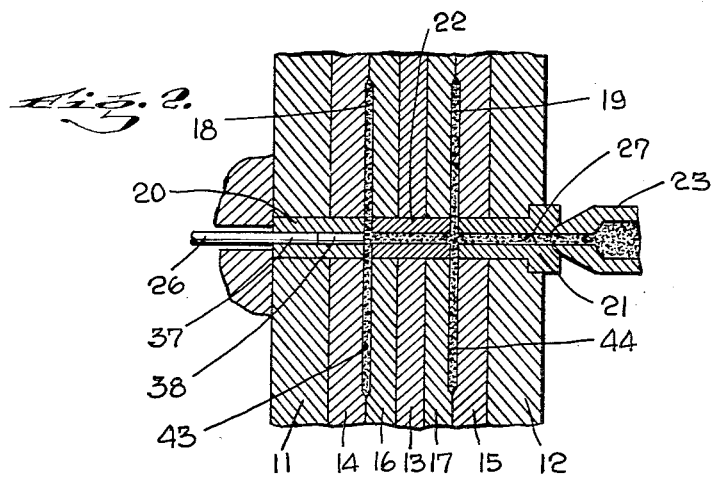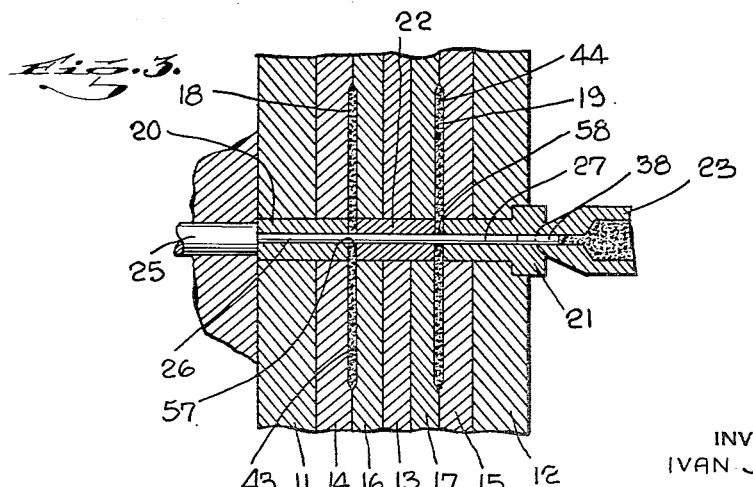

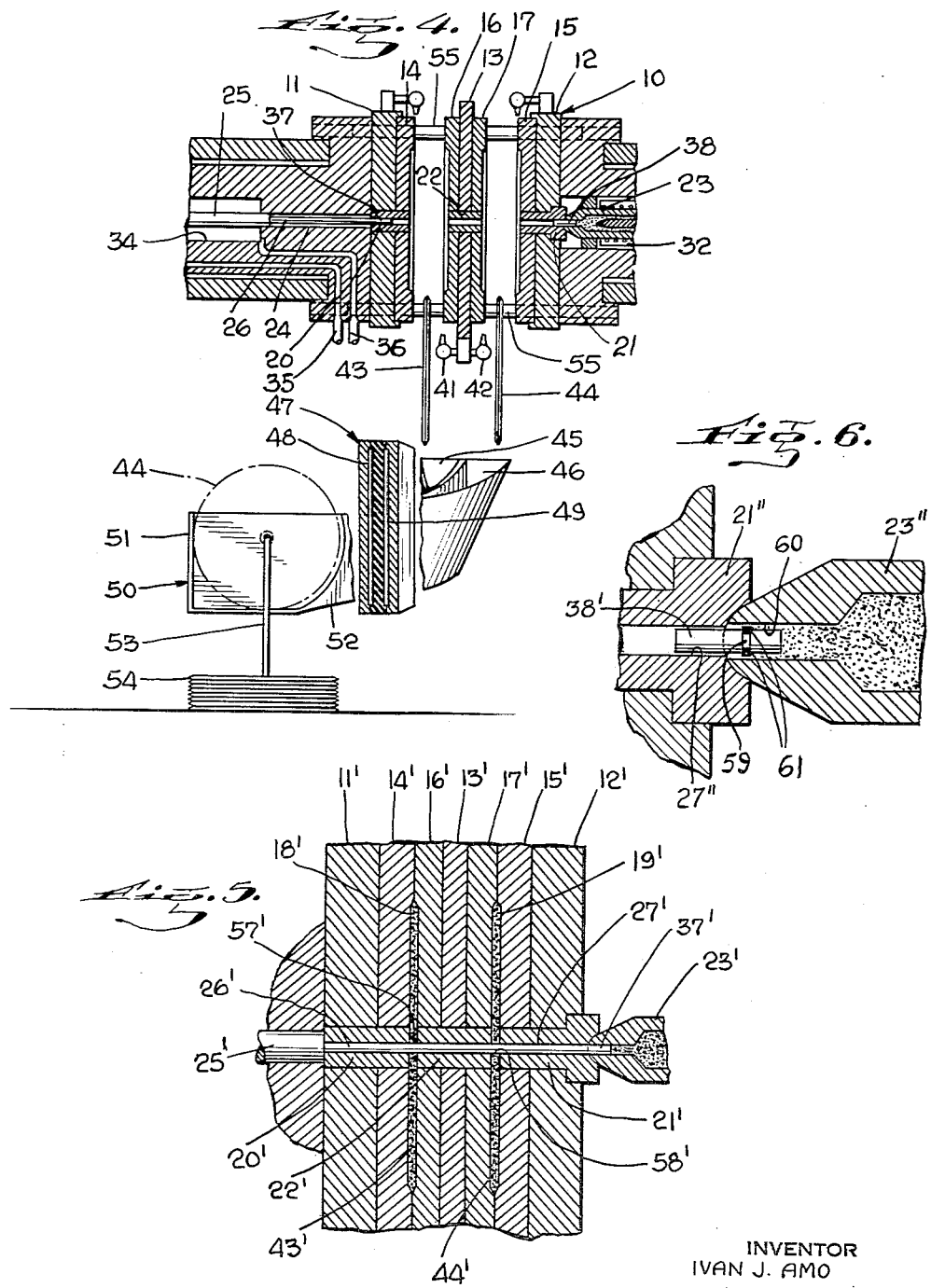

2,698,460

METHOD AND APPARATUS FOR PRODUCING INJECTION MOLDED PRODUCTS

Ivan J. Amo, North Plainfield, N. J., assignor to M and W Company, Inc., Rahway, N. J., a corporation of New Jersey Application October 1, 1951, Serial No. 249,179

6 Claims. (Cl. 18—30)

This invention relates to injection moulding machines for casting or moulding products by heated material which is pressure injected into the cavity or cavities of the dies employed. More particularly, the invention deals with machines of the character described, wherein a pair of products can be simultaneously formed in spaced cavities arranged face to face and, wherein, the sprue is automatically removed from the products and holes are formed in the products prior to freeing or discharging the products from the dies, when in opened position.

Still more particularly, the invention deals with a method of injection moulding, wherein a pin element is employed to normally seal the nozzle controlling discharge of heated material into the die cavity and automatically moved by the pressure of the material into a position, exposing the sprue passage to the die cavity with means to then operate said element to clear the sprue passage in returning material to the nozzle and again sealing the nozzle, preparatory to the next cycle of operation of the machine.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic and broken sectional view through the die mechanism of an injection moulding machine, indicating in outline the mechanism for actuating the essential parts in performance of a cycle of operation, the dies being shown in closed position, preparatory to receiving the injection charge.

Fig. 2 is an enlarged view, showing part of the construction illustrated in Fig. 1, and indicating the first step in the method of forming a pair of cast or moulded products.

Fig. 3 is a view similar to Fig. 2, showing the next step in the method.

Fig. 4 is a view substantially on the scale of Fig. 1, showing the die mechanism in open position and diagrammatically illustrating the discharge of cast products and the cooling and collection station, or assembly station of the products.

Fig. 5 is a view similar to Fig. 3, showing a modified form of construction; and Fig. 6 is an enlarged sectional detail view similar to Fig. 3, showing a modification.

For the purpose of illustrating one adaptation and use of my invention, I have diagrammatically illustrated in Fig. 1 of the drawing certain parts of an injection moulding machine of the plastic type to illustrate the method of producing cast or moulded products. Still more specifically, the present invention, as shown in the accompanying drawings, deals with a pair of similar products such, for example, as a pair of disc phonograph records which are simultaneously formed and then discharged from the dies. In Fig. 4 of the drawing, I have diagrammatically illustrated the steps of cooling the formed products and then assembling the same at an assembly or collection station.

In Figs. 1 to 4, inclusive, I have shown at 10 a die unit or assemblage comprising outer dies 11 and 12 and an intermediate die 13. The die 12 is preferably a stationary die; whereas, the dies 11 and 13 are movable relatively to each other and also to the stationary die 12, in the manner clearly illustrated in Fig. 4 of the drawing, where the unit 10 is shown in its open position.

At this time, it may be well to state that my invention deals with injection moulding apparatus as disclosed, for example, in my prior application, Serial Number 203,065; filed December 26, 1950, now Patent No. 2,642,621, in which application a cooling stage, diagrammatically referred to in this application, is more specifically disclosed.

On the surface of the die 11 is a suitable matrix 14, a matrix 15 being disposed on the die 12 and two of these matrices 16 and 17 are disposed on opposed surfaces of the dies 13; thus an impression or cavity 18 is formed between 14 and 16 and another similar impression or cavity 19 is formed between 15 and 17. In the construction shown, the cavities 18 and 19 are characterized to form side by side and in spaced relationship to each other a pair of disc records. This relationship may also be said to be face to face when considering such products as disc records.

In each of the dies, centrally thereof, is a tubular bushing 20 for the die 11; 21 for the die 12 and 22 for the die 13. These bushings form collectively a sprue passage which extends from the discharge nozzle 23 into a tubular bore 24, in which a plunger 25 is mounted, the plunger carrying, at its forward end, a pin 26. The sprue formed by the combined bushings will be generally identified by the reference character 27. This sprue also places the two cavities 18 and 19 in communication.

Mounted in the tubular portion 28 of the nozzle 23 is a plunger sleeve or tube 29 operated by any suitable means to advance plastic material 30 from the hopper 31 into the heated zone, diagrammatically indicated at 32 for heating the material, preparatory for injection into the cavities of the dies. This heated zone will be sufficiently large to provide the proper supply of material to the cavities in each cycle of operation of the machine.

The plunger 25 has a piston head 33 operating in a cylinder 34, to the opposed ends of which are directed supply and exhaust passage 35, 36 controlling hydraulic actuation of the piston and the pin 26 operated thereby. The piston 33 is shown in Fig. 1 in its fully retracted position, which leaves the free end 37 of the pin disposed within the bushing 20 at a predetermined distance from the cavity 18. This distance is equal to the length of a freely moving pin element 38 which actuates as a control element to initially block off the discharge end of the nozzle 23 in the manner illustrated in Fig. 1 of the drawing and also shown in Fig. 3 of the drawing.

The pin or control element 38 is preferably made a snug fit in the bore defined by the sprue 27; whereas, the pin 26 can be slightly smaller in diameter and have a more free action in the sprue passage.

At 39 and 40 I have shown air discharge nozzles positioned in alinement with the parting line of the dies or the members 14, 16; 15, 17 thereof and a pair of similar nozzles 41, 42 are supported on the die 13, these nozzles serving to free the castings from the cavities or impressions as the dies are moved into open position, so that the pair of products, as for example at 43, 44, Fig. 4, can drop into a pair of troughs, diagrammatically seen at 45 and 46 to be directed to a cooling station, generally and diagrammatically illustrated at 47 in Fig. 4 of the drawing, this station having a pair of recesses or chambers 48 and 49 for reception of the products 43 and 44 and where the products are held for a period of time between the movable members of said station and then released for discharge onto suitable receivers at a collecting or receiver station, one of which is diagrammatically shown at 50 in Fig. 4. This station has suitable means, as at 51, at the end of a trough 52 for checking and alining a record as, for example, a record 44, indicated in dot and dash lines to automatically drop over a stacking wire or finger 53 to form a stack or pile 54.

The dies 11 and 13 are slidably mounted on suitable guide rods, as diagrammatically seen at 55 in Fig. 4 of the drawing and these dies are actuated by suitable means for movement from the closed position of Fig. 1 to the fully opened position of Fig. 4, suitable means being provided to check movement of the die 13, while permitting further movement of the die 11. In other words, the die 13 moves a lesser distance than does the die 11.

In Fig. 1 of the drawing, a piston is indicated at 56 for actuating the die 11. However, no detailed description of the die actuating mechanism or showing thereof is made, as this, in itself, forms no part of the present invention. In this connection, it will be apparent that suitable timing is provided for controlling the various operations, including the blast of air from the nozzles 39, 40, 41 and 42 in freeing the products from the die cavities.

Referring now to Figs. 1 to 4, inclusive, it will be apparent that, in Fig. 1, I have shown what may be termed the first stage of a complete cycle of operation, the pin or control element 38 being disposed in and sealing the outer end of the nozzle 23. The first step in this cycle of operation comprises the pressure injection of the heated casting or moulding material into the sprue 27 and, thus, into the cavities 18 and 19. In this operation, the element 38 has been moved longitudinally through the sprue 27 and strikes the end 37 of the plunger pin 26. This stops the end of the element 38 in alinement with the left surface of the cavity 18, as seen in Fig. 2 of the drawing.

On completing the injection stroke and filling the cavities 18 and 19 with the heated material to form in these cavities the products 43, 44, namely the disc records, then the piston 33 is actuated to advance the pin 26 which moves the control element 38 from the position shown in Fig. 2 to the position shown in Fig. 3, which operation automatically pierces a hole 57 in the product 43 and 58 in the product 44 and, at the same time, returns all of the material contained in the sprue 27 back into the nozzle 23, the element 38 being advanced to the position shown in Fig. 3, where it blocks and seals the end of the nozzle, preventing any discharge therefrom or from the bushing 21.

In injection moulding machines of the kind under consideration, difficulty has been experienced in the oozing of heated materials from the discharge nozzle of the machine. My automatic control element may be characterized as a control valve, which maintains the heated plastic material within the nozzle and heated zone of the machine and keeps the sprue free and clear of any solidified materials which tend to interfere with normal free operation of the machine. The fit of the element 38 in the sprue passage, defined by the several bushings and, particularly, in the bushing 21, is such as to comprise a close fit which would prevent any movement of the pin by flow of the heated plastic material, when the parts are in a position similar to that shown in Fig. 1. On the other hand, in the pressure discharge of the heated plastic material from the nozzle, the element 38 will move freely through the sprue passage 27 to its stop position, as shown in Fig. 2, where it is checked by the pin 26.

After movement of the pin 26 into the position shown in Fig. 3 and positioning of the element 38 in the nozzle 23 and bushing 21, the pin 26 is moved to the left, simultaneously with opening movement of the dies 11 and 13, the pin 26 moving sufficiently fast to clear the opening between the dies, as noted in Fig. 4, so as to permit the free discharge of the products or disc records 43, 44 in the manner diagrammatically shown in Fig. 4. The instant the dies start to open, the air nozzles 39, 40, 41 and 42 operate to free or displace the products 43, 44 from the surfaces of the matrix to which these products might have a tendency to adhere. In some instances, it may be the surfaces of the matrices 14, 15 or, in other instances, the matrices 16 and 17.

While the idea of forming two or more products simultaneously between a pair of dies is generally known in the art, the distinctive feature in my present structure and method resides in simultaneously forming a pair of products side by side and then severing the sprue leading to the cavities forming said products and, at the same time, forming apertures in the products so that, in the production of such products as disc records, substantially finished products are formed, that is to say, products which require no trimming operations. By reason of this method of procedure, the two discs can be delivered directly to a cooling station for more positively setting the material for the purpose of preventing warpage and then to deliver the products to a collection station.

It will be understood that, while a pair of products are being chilled and set at the cooling station, another pair of products are being formed at the forming or moulding station defined by the die unit 10, thus in each cycle of operation of the machine, a pair of products will be delivered to the receiving or stacking station 50, while another pair of products are being formed at the forming station.

In Fig. 5 of the drawing, I have shown a slight modification from the structure shown in Figs. 1 to 4, which simply deals with the omission of the control pin element 38. In other words, in Fig. 5, at 11', 12' and 13' are shown dies, similar to the dies 11, 12 and 13 and at 14', 15', 16', 17' are indicated matrices, similar to the matrices 14, 15, 16 and 17. 18' and 19' are the cavities. At 27' is shown the sprue passage in the bushings 20', 21' and 22'. At 23' is shown the injection nozzle, similar to the nozzle 23, and at 26' is shown a pin substantially similar to the pin 26, excepting that it is made longer than the pin 26 to make up the added length of the element 38 and at least the end portion 37' thereof will be made a close fit in the sprue passage 27'. The plunger for the pin 26' is shown at 25'.

With the structure shown in Fig. 5, the pin 26', alone, operates to return the material of the sprue back to the nozzle 23' and to form the apertures 57' and 58' in the products 43' and 44'. Upon return of the pin 26' to its normal position, similar to that shown in Fig. 1, it will be apparent that the end 37' will be in alinement with the left wall of the cavity 18'.

In Fig. 6 of the drawing, I have shown a modified form of control element 38', the modification comprising the formation of an annular groove 59 in the control element at such a position as to be disposed within the end of the nozzle 23" when in the position as shown in Figs. 3 and 4. In Fig. 6, I have indicated at 21" a bushing, similar to 21. In Fig. 6, I have also exaggerated to some degree the showing of the sprue passage 27" simply to show that this passage is of slightly less diameter than the bore 60 at the discharge end of the nozzle 23".

With this construction, a plastic sealing ring 61 is automatically formed in the groove 59 of the element 38'. In other words, in the initial injection stroke of the machine, the heated plastic material passes over the element 38' to a point entering the groove 59 and then as the element 38' enters the sprue 27" the ring 61 becomes automatically sized to fit snugly in the sprue and this ring will remain in the groove during successive strokes of the machines and will, at all times, be in a semi-hard or semi-soft state. By employing this construction, a more free movement of the element 38' can be provided in the sprue passage.

It will be understood that the clearances illustrated in Fig. 6 are exaggerated simply to illustrate the formation of the sealing ring 61. The pin 38', in reality, fits snugly in the sprue 27".

Having fully described my invention, what I claim as new and desire to secure by Letters Patent is:

1. The herein described method of forming moulded products by pressure injection of heated material into the cavity of a pair of dies through a sprue passage placing an injection nozzle in communication with said cavity, which comprises arranging a free control element normally in the discharge end of the injection nozzle to seal said end and check movement of heated material through the discharge of said nozzle, then advancing said element through the sprue, to a point exposing said cavity, by the pressure discharge of heated material from said nozzle into the sprue and die cavity in forming a product including an integral sprue portion, then actuating said free element to sever the sprue portion from the product and return the same and said element to said nozzle, and then separating said dies and removing the formed product from the cavity thereof.

2. The method of producing moulded thermoplastic products and trimming the products while held within the dies for forming said products, which comprises pressure injecting heated thermoplastic material from a heated zone simultaneously into cavities of relatively movable cooled dies, partially forming one of the mould cavities by a free pin exposed to said cavity and arranged at one end of a sprue removal element, forming solidified products including an integral sprue of the material injected into said cooled dies, then moving said element and pin across the cavities to trim the entire sprue from said products, while supporting the products in said closed dies and deliver the entire sprue to said heated zone for re-heating, retracting said element and separating the dies in removing the products therefrom while leaving said free pin adjacent the heated zone, then closing the dies, and then returning the free pin to position exposed to said first named die cavity and adjacent said element in the next successive injection of heated thermoplastic material into said die cavities.

3. In injection moulding machines, a fixed outer die, a movable outer die and a movable intermediate die, means forming a pair of cavities between said outer and intermediate dies, said dies having a one diameter sprue passage disposed in common alinement through said dies and joining said pair of cavities, a nozzle on said fixed die in alinement with said sprue passage, means for injecting heated material into said sprue passage and cavities through said nozzle in forming solidified products in said cavity and a solidified sprue, means of common diameter to and freely arranged in said sprue passage and actuated in one direction by the material injected into said sprue for checking flow of material beyond the cavity of the movable outer die, and means for actuating said last named means to move the same from said checking position through said sprue passage and into said nozzle in return of the solidified sprue to said nozzle.

4. In injection moulding machines, a fixed outer die, a movable outer die and a movable intermediate die, means forming a pair of cavities between said outer and intermediate dies, said dies having a one diameter sprue passage disposed in common alinement through said dies and joining said pair of cavities, a nozzle on said fixed die in alinement with said sprue passage, means for injecting heated material into said sprue passage and cavities through said nozzle in forming solidified products in said cavity and a solidified sprue, means of common diameter to and freely arranged in said sprue passage and actuated in one direction by the material injected into said sprue for checking flow of material beyond the cavity of the movable outer die, means for actuating said last named means to move the same from said checking position through said sprue passage and into said nozzle in return of the solidified sprue to said nozzle, and said second named means comprising a free control element normally positioned in the nozzle in checking discharge of material from said nozzle.

5. A die structure for injection moulding machines, comprising a plurality of relatively movable dies arranged side by side and having alined sprue passages of one diameter, independent cavities between adjacent surfaces of adjacent dies, said cavities being joined by said alined sprue passages, means for injecting heated material through a nozzle into the sprue passages and said cavities to form solidified products in the cavities and an integral solidified sprue, a sprue ejector including a free pin having a diameter common to that of said sprue passages, said ejector being normally supported in one of said dies and closing the sprue passage therein, said pin being movably supported in said nozzle, means for actuating said sprue ejector and pin to remove the solidified sprue from the products and from all of said sprue passages and to return the same to said nozzle, and said free pin being movable in one direction through the sprue pasasges by pressure injection of heated material into said sprue passages and die cavities.

6. In machines for pressure injection of heated plastic material into cavities of a pair of dies, a nozzle through which heated plastic material is adapted to be pressure injected into the die cavity, means forming a sprue passage between said nozzle and die cavity, a free control element movable in said sprue passage, said element normally blocking discharge of said nozzle intermediate injection strokes of the machine, said element being advanced through the sprue passage to a position clearing the cavity by pressure injection of material into said cavity through said sprue passage, and means directly engaging said element for moving the same longitudinally of the sprue passage in severing the sprue from the product and in returning the sprue and said element to position within the nozzle while the product formed in said cavity is maintained within the die.

References Cited in the file of this patent

UNITED STATES PATENTS

| | | |
|---|---|---|
| 1,215,784 | Enley | Feb. 13, 1917 |
| 2,239,338 | Norelli | Apr. 22, 1941 |
| 2,471,148 | Gale et al. | May 24, 1949 |
| 2,476,558 | Moxness | July 19, 1949 |
| 2,571,766 | Soulino | Oct. 16, 1951 |
| 2,613,395 | Massler | Oct. 14, 1952 |
| 2,642,621 | Amo | June 23, 1953 |